United States Patent [19]

McComb et al.

[11] 4,097,213
[45] Jun. 27, 1978

[54] MECHANISM FOR ADJUSTING AN EXTRUSION DIE IN CEREAL GRAIN EXTRUDER APPARATUS

[75] Inventors: Kenneth H. McComb; Timothy I. McComb, both of Denver, Colo.

[73] Assignee: Dorsey-McComb Distributors, Inc., Denver, Colo.

[21] Appl. No.: 772,743

[22] Filed: Feb. 28, 1977

[51] Int. Cl.² .............................................. B29F 3/04
[52] U.S. Cl. ................................. 425/376 B; 425/381; 425/466; 425/467; 426/516
[58] Field of Search ............... 425/380, 381, 466, 467, 425/376 B, 376 R, 207, 208, 309, 310, 308; 426/516; 264/176 R, 209

[56] References Cited

U.S. PATENT DOCUMENTS

| 281,711 | 7/1883 | Merrill | 425/376 B X |
|---|---|---|---|
| 3,339,235 | 9/1967 | Nossol | 425/466 |
| 3,666,389 | 5/1972 | Nelson | 425/381 X |
| 4,021,170 | 5/1977 | Andersen et al. | 425/466 X |
| 4,025,260 | 5/1977 | Neel | 426/516 X |

FOREIGN PATENT DOCUMENTS 4,574   10/1969   Japan ..................... 425/207

Primary Examiner—Francis S. Husar
Assistant Examiner—Mark Rosenbaum
Attorney, Agent, or Firm—Ralph F. Crandell

[57] ABSTRACT

Apparatus for producing a curled food product by extruding gelatinous cereal grain meal includes a mechanism for adjusting the extrusion space between two complimentary frustroconically shaped die surfaces of die extrusion members. One die member is maintained in an axially or longitudinally stationary position while the other die member is moved axially or longitudinally with respect to the stationary member. As a result, the space between the complimentary die surfaces may be adjusted to control the cereal grain extrusion process. Adjusting the extrusion die includes longitudinally adjusting a second frustroconically shaped die surface in face-to-face relation with a first complimentary and frustroconicaly shaped die surface in order to adjust the separation space therebetween.

9 Claims, 9 Drawing Figures

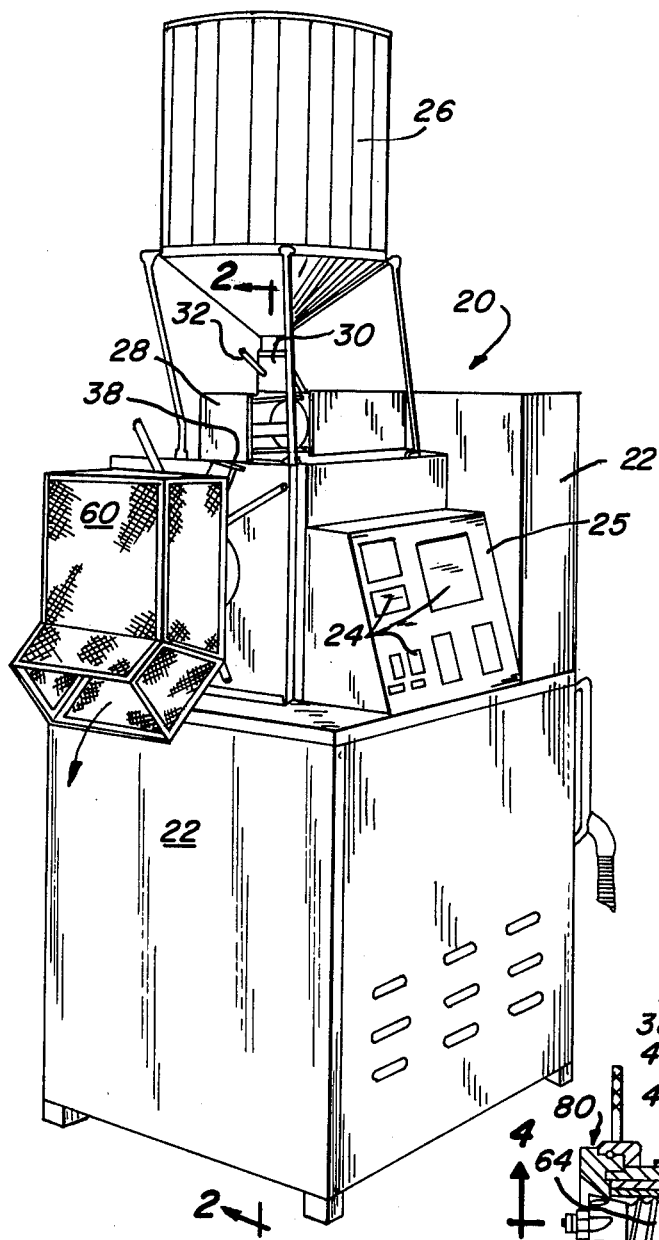
Fig_1
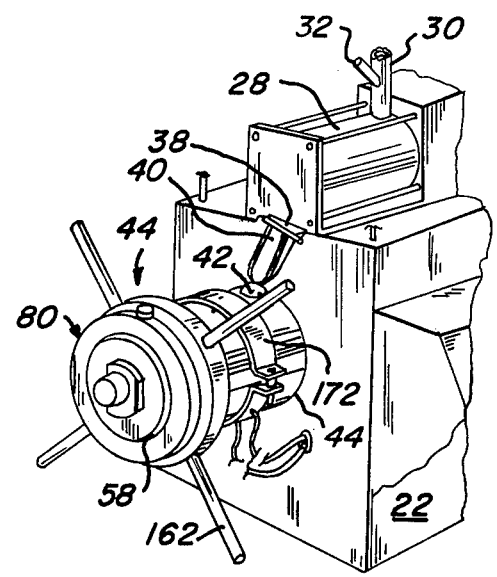
Fig_3
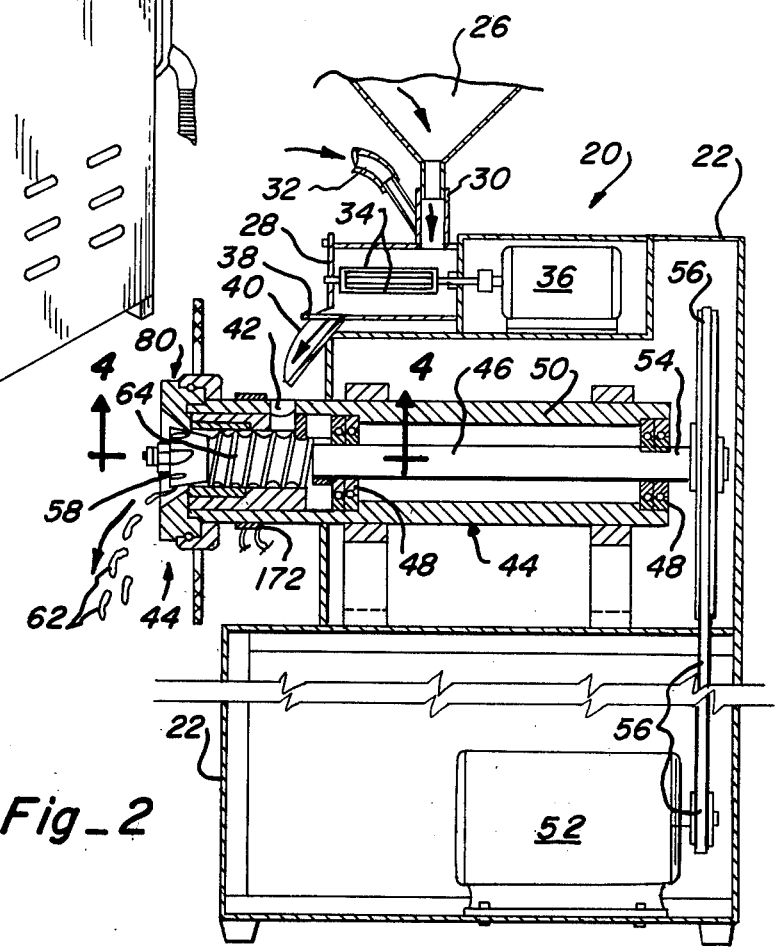
Fig_2

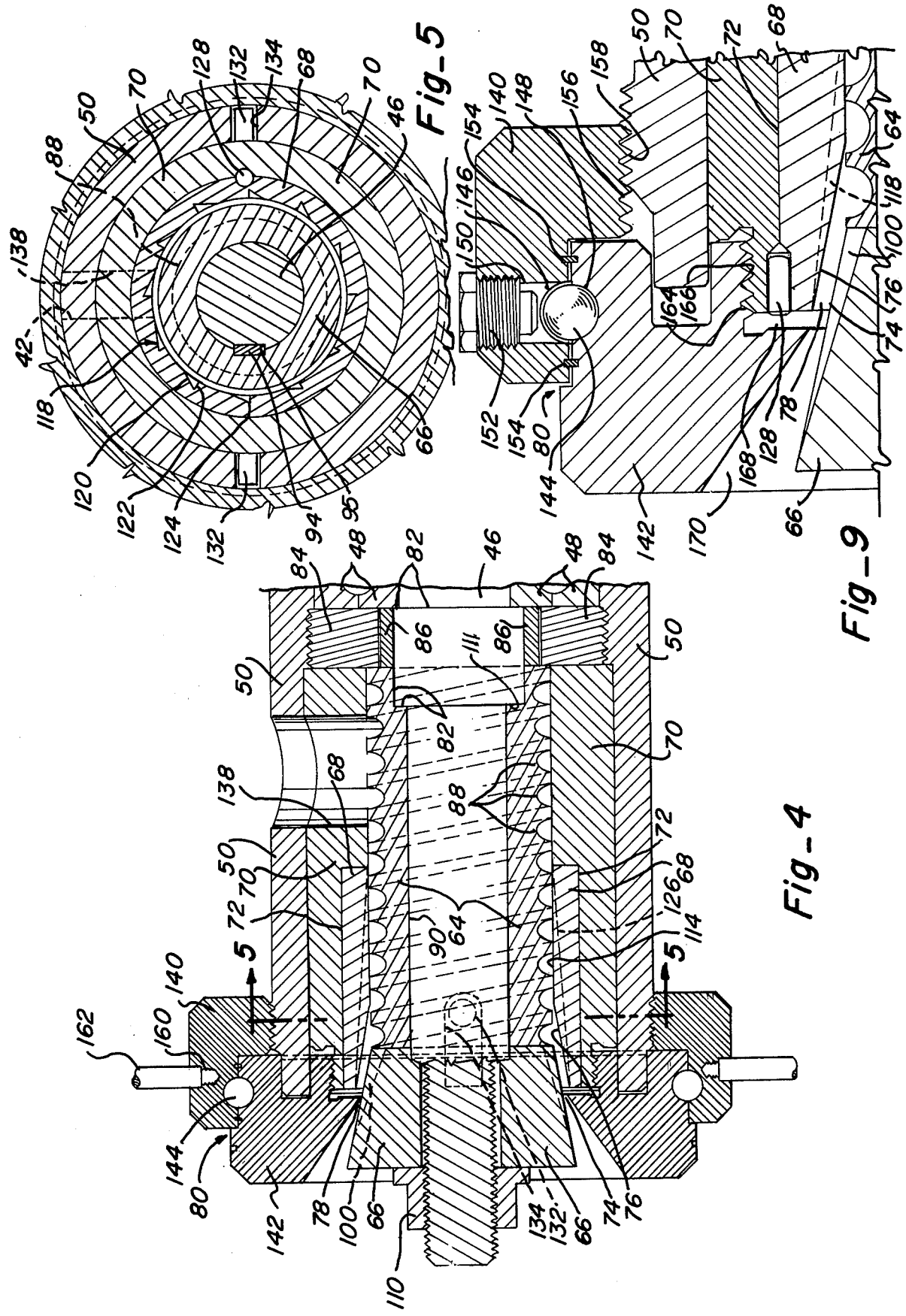

MECHANISM FOR ADJUSTING AN EXTRUSION DIE IN CEREAL GRAIN EXTRUDER APPARATUS

BACKGROUND OF THE INVENTION

1. Field of the Invention

This invention relates to an apparatus for manufacturing curled food products by extrusion of gelatinous cereal grain meal. Such food products are generally baked or fried and coated, and thereafter consumed as snack foods. More specifically, this invention relates to a mechanism for adjusting an extrusion die in a cereal grain extrusion apparatus.

2. Description of the Prior Art

Conventional apparatus for manufacturing extruded food product involves an extruder for transforming a predetermined mixture of cereal grain meal, such as corn meal, and water into the extruded food product. The extruder includes an auger device for compressing and moving the mixture through the extruder. The resulting friction and pressure created by this movement results in a high temperature which causes the water to evaporate, and the corn meal and water mixture is transformed into a gelatinous material of relatively high temperature and internal pressure. The gelatinous material is extruded through a die plate having a plurality of fixed size orifices into the atmosphere, where it quickly expands and cools into a solidified material, resulting in a strand of solidified food product. Cutters break the strands into desired lengths, giving each piece a puffed appearance. An example of such apparatus employing a die plate with fixed size orifice configuration is U.S. Pat. No. 3,190,210 to B. W. McComb, et al., assigned to the assignee of the present invention.

Advantages of extruders employing a die plate with fixed orifice size configuration are that the machines may be compact in size to avoid consuming excessive space in the food product manufacturing facility, and that the machines may be relatively simple in construction with a minimum number of moving parts and needing only one source of motive power, for example, one electric motor.

Disadvantages of extruders employing a die plate with fixed orifice size configuration are that the size of the orifices cannot be adjusted to accommodate different types and mixtures of cereal grain meals, that a special starting meal must be employed to elevate the temperature of the apparatus to an operating level before the desired hydrated cereal grain meal is fed into the machine to produce the actual food product and that the extruder must be disassembled for cleaning.

Another type of prior art extruded food product manufacturing apparatus employs two generally concentric die members having complimentary frustroconically shaped die surfaces which generally take the place of the fixed orifice die plate member in a machine of the type previously described. One or both of the die members is typically rotated and grooves cause the gelatinous material to be extruded in curled strands from between a small annular space between the complimentary die surfaces. Food product manufactured in this manner assumes curled appearance due to the rolling or curling manner of its extrusion. Examples of the type of apparatus having complimentary frustroconical die members are U.S. Pat. No. 2,060,408 to Wood issued Nov. 10, 1936, and U.S. Pat. No. 2,120,138 to Mathews, et al., issued June 7, 1938.

Advantages of extruding apparatus employing complimentary frustroconical die surface members, are that a higher rate of food product production may be obtained as compared with a fixed orifice size die plate machine of similar size, cost and operating expense; that no starting meal is required to start production, since the desired meal and water mixture may be used throughout the full production process; and that the machine need not be disassembled for cleaning, since the machine will be essentially self-cleaning by action of the cereal meal passing through a large annular space adjusted between the complimentary die surfaces.

Disadvantages of prior art extruders employing the complimentary frustroconical die surfaces are that the construction of the machinery has previously involved a large number and arrangement of relatively complex and costly elements necessary to start, adjust and properly control food product production. Examples of these disadvantages can be better understood from the prior art itself.

Regarding the aforementioned patent to Wood, in order to adjust the annular extrusion space between the complimentary frustroconical die surface members, relatively complex and large adjustment apparatus moves the interior frustroconical die surface member axially with respect to the stationarily positioned outer frustroconical die surface member. Such an arrangement requires complex bearing and support structures for the adjustment apparatus to position, retain and adjust the interior frustroconical die surface member, which prevents the extrusion of food product from the end of the machine and adds to the overall size of the machine. Regarding other prior art machines, the outer frustroconical die surface member has been positioned in stationary position, and the inner frustroconical die surface member has been attached adjacent the end of the auger for rotational movement with the auger. Both the auger and attached inner frustroconical die member have been moved axially to adjust the annular space between the complimentary die surface members. This arrangement has involved a complex bearing structure and power transmission means to allow the center shaft, auger and inner die member assembly to be supported for both rotation and axial movement. Regarding the aforementioned patent to Mathews, et. al., it appears that both the inner and outer frustroconical die surface members are maintained in a fixed relation, thereby preventing any adjustment while the machine is in use.

OBJECTS OF THE INVENTION

It is, therefore, the general object of this invention to provide an advantageous and improved mechanism for adjusting the space between complimentary frustroconical or curvilinear die surface members in a curled food product extrusion apparatus by axially or longitudinally moving one die surface relative to an axially or longitudinally stationary die surface member.

It is another object of this invention to provide apparatus of the aforementioned type for manufacturing curled food product, which consumes approximately the same floor space as an extruder apparatus employing fixed orifice size die plate.

It is still another object of this invention to provide apparatus of the aforementioned type which allows easy and ready adjustment of the extrusion opening between the die surfaces to accommodate different mixtures of cereal grain meal and moisture content.

It is still a further object of this invention to provide a curled food product extruding apparatus which is conveniently operated and which obtains a relatively high production rate of extruded food product compared to extruding apparatus having a fixed orifice die plate.

SUMMARY OF THE INVENTION

The present invention is embodied in an improved extruder apparatus for a curled food product manufacturing machine comprising means for changing cereal grain into gelatinous material and for extruding it from a space between a first frustroconical or curvilinear die surface of a first axially or longitudinally stationary die member and a complimentary second frustroconical or curvilinear die surface of a second die member, and adjustment means for moving the die surface of the second die member axially or longitudinally with respect to the axial or longitudinal stationarily positioned first die member. The first and second complimentary shaped die surface members are preferably in face-to-face relation in the flow of gelatinous material, and one die surface member is preferably moved axially or longitudinally with respect to the other axial or longitudinal stationary die surface member to adjust the annular space between the die surfaces.

The invention can be more fully appreciated from the following brief description of the drawings, description of a preferred embodiment of the invention, and appended claims.

BRIEF DESCRIPTION OF THE DRAWINGS

FIG. 1 is a perspective view of apparatus embodying the present invention for producing curled food product from cereal grain meal.

FIG. 2 is a side elevational section view taken substantially in the plane of line 2—2 of FIG. 1, with certain portions broken out for clarity.

FIG. 3 is an enlarged perspective view of the front of the extruder of FIG. 1, with certain elements removed for clarity.

FIG. 4 is an enlarged side elevational section view taken substantially in the plane of line 4—4 of FIG. 2.

FIG. 5 is a section view taken substantially in the plane of line 5—5 of FIG. 4.

FIG. 9 is an enlarged view of a portion of FIG. 4 with a portion broken out.

DESCRIPTION OF A PREFERRED EMBODIMENT

Figure 6:
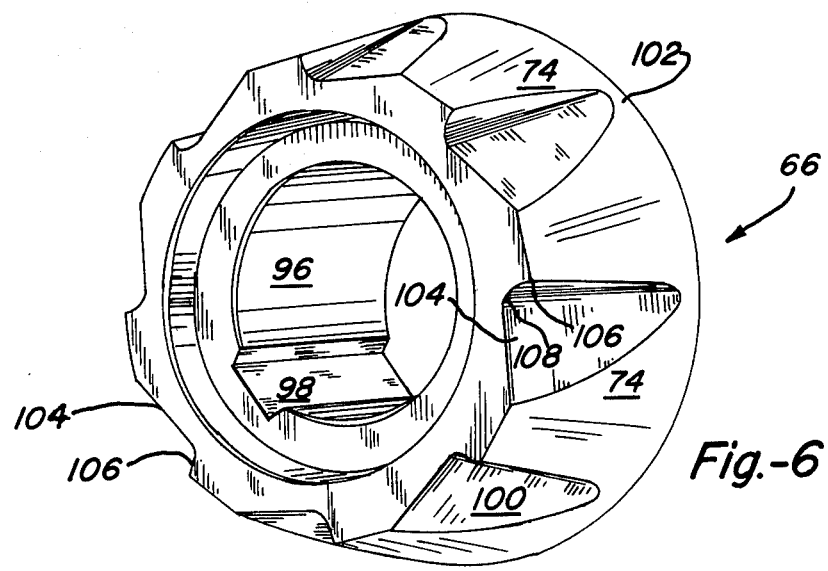
FIG. 6 is an enlarged perspective view of a first forming die member of the improved apparatus shown in FIGS. 4 and 5.

Referring now to FIGS. 1, 2, 3 and 4 there is shown an apparatus 20 embodying the present invention for producing curled food product such as corn curls from a cereal grain meal such as corn meal. The apparatus 20 comprises an outer enclosure or housing 22 for supporting and enclosing the working elements of the apparatus 20. Controls 24 supported on a control panel 25 allow an individual to control the operation of the apparatus 20. An upper hopper 26 receives, holds and supplies the cereal grain meal to be extruded as food product, and the hopper 26 is connected to a mixer 28 by a conduit 30. Cereal grain meal from the hopper 26 is mixed in the mixer 28 by the action of blade elements 34 moved or rotated by the main drive motor of the apparatus or optionally by a separate motor 36. Under some conditions, water from a water supply conduit 32 may be added to provide hydrated or moistened cereal grain meal within the mixer.

A hand valve 38 connected with the mixer 28 controls the flow of cereal grain meal down a chute 40 and into an opening 42 of the improved extruder apparatus 44. In this manner, a predetermined mixture of cereal grain meal is fed into the extruder apparatus 44 where it is first changed into a gelatinous substance by action of a rotating auger member 64 and then extruded from between die members 66 and 68 rotating relative to one another which are located at the discharge end 58 of the extruder apparatus 44. A housing 60 enclosing the die members at the discharge end of the apparatus 44 collects and conducts the extruded solidified curled food product 62 to a conveyor or container (not shown), and the food product can be then transported to another location for further processing, such as frying and coating.

A convention applied throughout the following description of the improved extruder apparatus 44 is that of using "inner" as a term of axial reference for position or location oriented toward the right in FIGS. 2 and 4, and of using "outer" as a term of axial reference for a position or location oriented toward the left of the extruder apparatus in FIGS. 2 and 4. The terms "inner" and "outer" are also used as terms of radial reference throughout the description, and in such usage, outer means more radially displaced from the center axis or line then does inner.

In general, the extruder apparatus 44 embodying the present invention includes an auger member 64 mounted coaxially on a center shaft 46 supported for rotation in an axially stationary position within a tubular support structure or housing 50, a first forming die member 66 mounted coaxially on the center shaft 46 axially adjacent the outer end of the auger member 64 for rotation with the center shaft 46 and the auger member 64, a second or female die member 68 mounted coaxially within the housing 50 and surrounding the center shaft 46 and the first die member 66 and the auger 64, and means 80 for axially moving the die surface of the second die member 68 with respect to the die surface of the first axially stationary die member 66 to adjust the annular space between the die surfaces of the die members 66 and 68.

Shown in FIG. 2 and 4, the center shaft 46 is supported in an axially stationary position by conventional bearings 48 supported within the housing 50. An annular shoulder 82 formed on the center shaft adjoins one bearing 48 to maintain a center shaft 46 free of axial movement in the right direction. Conventional means are provided for preventing axial movement of the center shaft in the other direction, to the left as shown in FIGS. 2 and 4. A disc 84 and seal 86 arrangement is employed to isolate the bearing lubricant from the hydrated cereal grain mixture. An electric motor 52 is connected to rotate the center shaft 46 at its power application end 54 by a power transmission means such as a belt and pulley arrangement 56.

Figure 8:
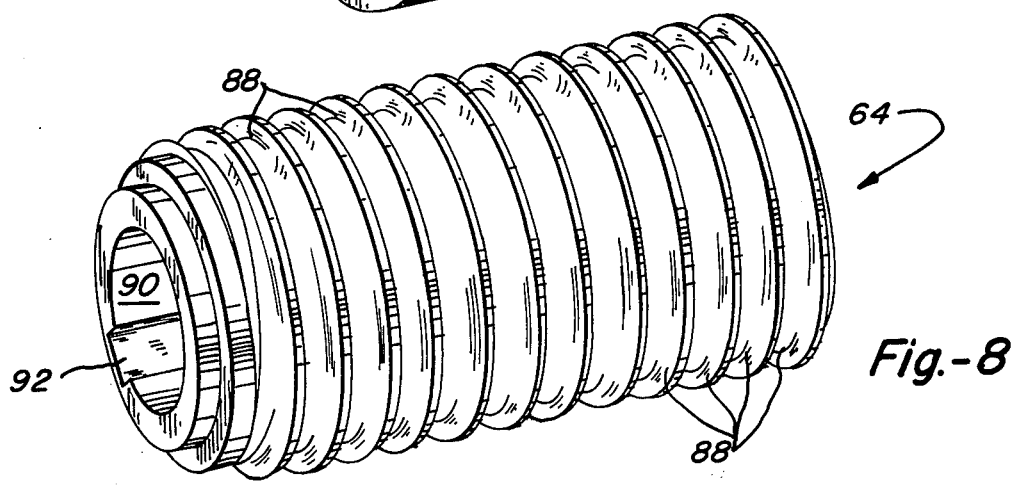
FIG. 8 is an enlarged perspective view of an auger member of the improved apparatus shown in FIGS. 4 and 5.

The auger member 64, shown in FIGS. 4, 5 and 8 is of a typical configuration having spiraling helical grooves 88 for moving material within the grooves longitudinally when the auger member is rotated. A cylindrical inner center bore 90 receives the center shaft 46, and a key 94 extending between the auger member 64 and the center shaft 46 causes the auger member to rotate in unison with the center shaft. A portion 92 of the keyway formed between the auger member and center shaft is shown in FIG. 8, and the remaining portion 95 of the keyway is shown in FIG. 5.

The first or forming die member 66, shown in FIGS. 4 and 6, is secured to the center shaft 46 axially adjacent the outer axial end of the auger member 64. A central cylindrical bore 96 in the first die member 66 receives the outer axial and threaded end of the center shaft 46. A key (not shown) in a keyway formed between the center shaft 46 and the die member 66 causes the die member 66 to rotate in unison with both the auger member 64 and the center shaft 46. A portion 98 of the keyway formed in die member 66 is shown in FIG. 6 and the remaining portion (not shown) is formed to extend axially along the outer threaded end portion of the center shaft 46.

To hold the auger member 64 and die member 66 in an axially stationary position with respect to the center shaft 46, a nut 110 (FIG. 4) is threaded on the outer end of the center shaft 46. Tightening the nut 110 against the die member 66 supplies axial force through the die member 66 to the auger member 64 causing an annular bore 111 at the inner axial end of the center bore 90 of the auger member 64 to abut the shoulder 82 of the center shaft 46.

As shown in FIGS. 4, 6 and 9, an external frustroconical die forming surface 74 of the first forming die member 66 defines an angle with respect to the axis of the center shaft. A plurality of equally circumferentially spaced grooves or notches 100 are formed in the die surface 74 for the purpose of promoting a curling effect during extrusion of the gelatinous cereal grain meal. The notches 100 extend from the inner axial edge of the die surface 74 to a position axially short of the outer axial die surface edge, thereby leaving an outer most portion 102 free of any indentions caused by the notches 100. Each of the notches 100 is formed by a generally shallowly inwardly angled, flat leading surface 104 and a generally steeply outwardly angled trailing surface 106. A rounded surface joint 108 connects the leading and trailing surfaces 104 and 106, and the leading and trailing surfaces contact the frustroconical die surface 74 at well defined edges.

Positioned coaxially with respect to the first forming die member 66 and the auger member 64, the second or female die member 68, shown in FIGS. 4, 5, 7 and 9, functions in conjunction with the first forming die member to provide an annular space 78 between complimentary frustroconical die surfaces of die members 66 and 68 through which the curled food product is extruded. The second or female die member 68 is maintained in its coaxial position by a sleeve member 70 received within the housing 50. The second die member 68 includes a frustroconically shaped die surface 76 radially adjacent and in face-to-face relation with a portion of the frustroconical shaped die surface 74 of the first forming die member 66. The die surface 76 defines an angle with the axis of center shaft 46 approximately the same as the angle of the die surface 74 of the first die member 66 with the axis of the center shaft. An internal cylindrical bore 114 of the second die member 68 has a diameter slightly larger than the outside diameter of the auger member 64 to allow the auger member to be received therein. A plurality of generally longitudinally extending and slightly radially outward protruding grooves 118 are formed in the surfaces 76 and 114 of the die member 68 for the purpose of promoting a curling effect of the gelatinous cereal grain meal as it is moved axially through the extruder apparatus by the auger member 64 and is extruded from between the frustroconically shaped die surfaces 74 and 76.

Each of the grooves 118 has substantially the same configuration which includes a relatively shallow radially outwardly angled leading surface 120, and a relatively steeply radially outwardly angled trailing surface 122 joined at a edge 124. Surfaces 120 and 122 are designated, respectively, leading and trailing edges, since a point on the rotating forming die member 66 would first rotate past surface 120 and last rotate past edge 122 of each groove 118. The leading surface 120 joins the surfaces 76 and 114 at a smooth, rounded edge, but the trailing surface 122 of each notch 118 makes a relatively sharp angled edge when joining the surfaces 76 and 114. The line defined by the sharp edge 124 joining the leading and trailing surfaces 120 and 122 defines a relatively constant outward radial angle 126 through the second die member 68.

An enhanced curling effect of the gelatinous cereal grain may be obtained if the number of grooves 118 in the female die member 68 is greater than the number of notches 100 in the male die member 66.

Figure 7:
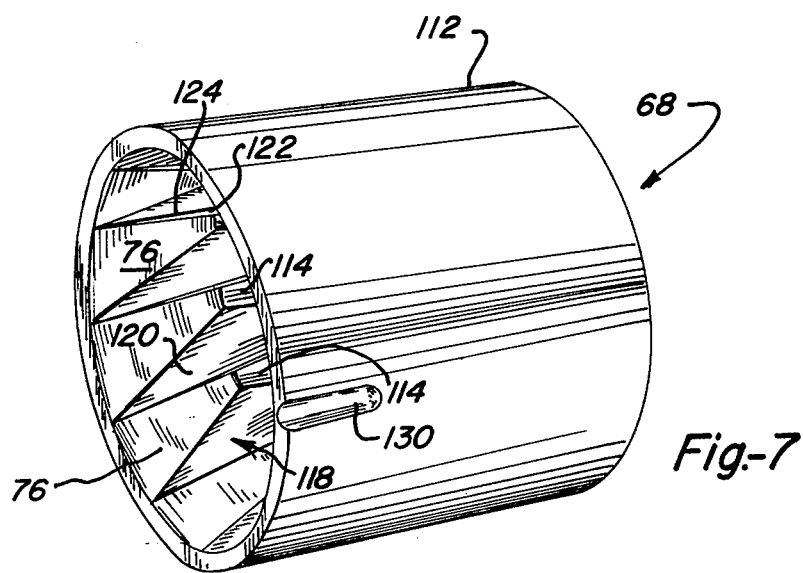
FIG. 7 is an enlarged perspective view of a second forming die member or female die member of the improved apparatus shown in FIGS. 4 and 5.

The sleeve member 70 shown in FIGS. 4, 5 and 9 moves the female or second die member 68 axially with respect to the forming die member 66 while positioning the female die member 68 coaxially with respect to the forming die member 66 and the auger member 64. An outer cylindrical surface 112 of the sleeve member 70 fits closely within the inner cylindrical bore of the housing 50 to prevent significant radial tolerance or movement. An annular bore 72 at the axially outer end of the sleeve 70 receives the second die member 68. A key 128 (FIG. 9) extending between the second die member 68 and the sleeve member 70 prevents relative rotation between members 68 and 70. A portion 130 of the keyway in the outer surface 112 of the die member 68 which receives the key 128 is illustrated in FIG. 7. To prevent the sleeve member 70 from rotating inside the housing member 50, two diametrically opposed posts 132 extend radially outwardly from the sleeve member 70 and are received from within two diametrically opposed and axially extending slots 134 formed in the housing member at its outer axial end. An opening 138 in the sleeve member allows the cereal grain corn meal to pass from the opening 42 in the housing 50 into the extruder apparatus 44 where it surrounds the axially inner end of the auger member 64.

Means 80, shown in FIGS. 2, 3, 4 and 9, for axially moving the die surface 76 of the second die member 68 with respect to the die surface 74 of the first die member 66 to adjust the annular space 68 between the die surfaces 74 and 76, comprises an outer annular member 140 and an inner annular member 142, which cooperate to move the sleeve member 70 and the female die member 68 axially with respect to the extruder housing 50 and the axially stationary first forming die member 66 and auger member 64. A plurality of ball bearings 144 within radially opposing concentric raceways 146 and 148 attach the inner and outer annular members 140 and 142 whereby the annular members may be rotated with respect to one another. The ball bearings 144 are introduced into the raceways through an opening 150 in the outer annular member 140 after the inner and outer annular members are placed concentrically together. A plug 152 is placed in the opening 150 to contain the ball bearings in the raceways 146 and 148 after the raceways have been filled. Sealing ring members 154 between the annular members contain lubricant around the ball bearings. Threads 158 are provided on the outer axial discharge end of the housing 50 to receive the threads 156 formed on the outer annular member 140. Four equally circumferentially spaced threaded holes 160 receive handles 162.

To attach the inner annular member 142 of adjustment means 80 to the sleeve member 70, there are provided threaded surfaces 164 and 166 to connect the inner annular member 142 to the sleeve member 70. The inner annular member 142 includes a radially inward projecting lip 168 for the purpose of contacting the outer axial end of the second die member 68 and the sleeve member 70 to hold the female die member 68 and sleeve member 70 substantially free of axial movement relative to the inner annular member 142. A radially outwardly extending frustroconical surface 170 extends from the lip 168 to avoid interference with the food product as it is extruded from the annular extrusion space 78 between the die surfaces 74 and 76 of the forming and female die members 66 and 68 respectively.

Operation of the adjustment means 80 to axially adjust the female die member 68 and its die surface 76 relative to the axially stationary forming die member 66 and its die surface 74 for the purpose of controlling the annular extrusion space 78 between the frustroconically shaped die surfaces of the die members is as follows. Rotating the outer annular member 140 with the handles 162 axially moves the outer annular member 140 with respect to the housing member as a result of action of the threads at 156 and 158. The ball bearings 144 in raceways 146 and 148 move the inner annular member 142 axially in unison with the outer annular member. The female die member 68 and sleeve member 70, connected to the inner annular member by threads 164 and 166 and by the lip 168, are moved axially in unison with the inner annular member 142. The inner annular member, the sleeve member and the female die member are prevented from rotating as a result of their previously described interconnection and as a result of the posts 132 (FIG. 5) of the sleeve member 70 extending into the slots 134 of the housing 50. In this manner, the female die member 68 and its die surface 76 are axially adjustable while they are maintained free of rotational movement, and the forming die member 66 and its die surface 74 and the auger member 64 are rotated while maintained free of axial movement.

Assembly of the extruder apparatus shown in FIG. 4, is accomplished by inserting the female die member 68 in the bore 72 of the sleeve member 70, and threading the sleeve member onto the inner annular member 142 by action of the threads 164 and 166. The annular members 140 and 142 have previously been assembled by inserting the ball bearings 144 in the raceways 146 and 148 and then inserting plug 152 in the opening 150, as described. The outer annular member 140 is threaded onto the housing 50 at threads 156 and 158 while the sleeve member 70 and female die member 68 are inserted into the inner cylindrical bore of the housing 50. The auger member 64 and forming die member 66 are then inserted on the center shaft 46 and securely connected thereto by the nut 110.

For elevating the temperature of the discharge end of the extruder apparatus 44 to a level to more quickly obtain operating conditions, an electric heater 172, shown in FIGS. 2 and 3, is attached to the exterior of the housing 50. Power is supplied to the electric heater 172 by the controls 24 at the control panel.

After the temperature of the extruder apparatus 44 has been elevated to a desired initial level, the electric motor 52 is started and the center shaft 46, the auger member 64 and the forming die member 66 are rotated as a result of the power transmission means 56. Cereal grain meal from the mixer 28 is delivered through the hand valve 38 down chute 40 and into the openings 42 and 138. Movement of the cereal grain meal to the left as seen in FIGS. 2, 4 and 9, results from the conveying action of the helical groove means 88 of the rotating auger member 64. The movement of the cereal grain meal by the auger member 64 creates high pressure and temperature in cereal grain meal and the moisture changes the cereal grain meal to a gelatinous material as it moves through the extruder apparatus. The grooves 118 of the female die member 68 roll or curl the gelatinous cereal grain meal as it is moved by the auger member along the surface 114 of die member 68. The notches 100 in the forming die member 66 further contribute to the curling effect as the forming die member 66 rotates. With proper axial adjustment of the female die member 68 relative to the forming die member 66, a very small annular opening 78 is provided between the die surfaces 74 and 76 to extrude the highly-pressurized, heated and curling gelatinous material into the air adjacent the discharge end of the extruder apparatus 44. The curling, gelatinous substance, once in the air, rapidly cools and expands to solidify into pieces or strands of curled food product. The strands may break naturally into different lengths as a result of contact with the channeling housing 60, or, after extrusion, the strands may be broken into predetermined lengths by conventional processing apparatus, if desired.

With the present invention, no starting mixture of cereal grain meal is required to start production of the curled food product. The cereal grain meal itself is initially used in conjunction with a relatively wide initial annular extrusion space 78 between the frustroconical die surfaces 74 and 76 of the die members 66 and 68. Initial extrusion of the cereal grain meal creates some elevation in temperature and pressure of the meal, although the initially extruded meal may not be fully gelatinized. The adjusting means 80 is then slowly rotated to reduce the annular extrusion space 78 thereby creating an increased temperature and pressure and forcing the cereal grain meal toward its gelatinous state. The annular space is reduced until an extremely high temperature and pressure result in the formation of a single tube-like piece of extruded food produce issuing from the extruder apparatus 44. Thereafter, to obtain the plurality of strands of extruded and curled food product, the annular opening between the frustroconical die surfaces is adjusted for a slightly increased opening. The production of extruded curled food product becomes self-sustaining with this adjustment, and the hand valve 38 at the mixer 28 is regulated to provide only that flow of cereal grain meal to the extruder apparatus which is actually used in the extrusion of food product. Minor adjustments in the annular space 78 between the die surfaces may be made to regulate the type and size of food product extruded according to the variety of cereal grain meal employed, for example.

To stop the extrusion and to clean the extruder, the space between the frustroconical die surfaces is increased until cereal grain meal discharges from the end of the extruder apparatus in an ungelatinized state. This large annular space stops the extrusion by reducing the pressure and temperature within the extruder, and the raw cereal grain meal cleans the extruder apparatus. In this manner, the extruder may be easily stopped and started without disassembling various internal parts for cleaning, as has been required in certain prior art die plate extruding apparatus.

The presently preferred embodiment of the invention has been described in detail to enable its clear understanding. It should be understood that the scope of the present invention is not intended to be limited by this detailed description. On the contrary, it is the intention to cover modifications, alterations, constructions, equivalents and uses falling within the spirit and scope of the appended claims.

We claim:

1. An extruder apparatus for extruding a plurality of strands of gelatinous cereal grain material which thereafter form curled cereal grain food product, comprising, in combination:

a housing means;

an auger member mounted for rotation in an axially stationary position in said housing means, said auger member having helical groove means for moving cereal grain meal material from an inner axial position to an outer axial and discharge position and for operatively changing cereal grain meal into a gelatinous material upon rotation of said auger member;

a forming die member mounted in an axially stationary position adjacent the outer axial end of said auger member for rotation with said auger member, said forming die member having a frustroconically shaped outer die surface and a plurality of grooves formed in the outer die surface, the grooves extending generally in an axial direction;

a female die member mounted in a rotationally stationary position circumjacent at least a portion of said forming die member, said female die member having a frustroconically shaped inner die surface generally complimentary in shape to the outer surface of said forming die member, the inner die surface having a plurality of grooves formed therein and generally extending in an axial direction;

the inner and outer die surfaces of said forming and female die members respectively defining an annular extrusion orifice through which a plurality of strands of the gelatinous material are extruded, the strands being formed at least in part by the grooves; and adjustment means operatively associated with said female die member for moving said female die member axially with respect to said forming die member to adjust the width of the annular extrusion orifice between the frustroconical die surfaces of said forming die member and said female die member to insure the change of cereal grain meal into the gelatinous material and regulate the extrusion of strands of gelatinous material from the annular extrusion orifice.

2. An extruder as recited in claim 1 further comprising:

said housing means operatively receives said auger member therein substantially free of relative axial movement therebetween; and wherein said means for moving said female die member axially with respect to said forming die member comprises:

an outer annular member operatively connected to said housing means for axial movement therealong when rotated;

an inner annular member coaxial with said outer annular member;

connection means operatively associated with said inner and outer annular members for rotatably connecting said inner and outer annular members and for maintaining said inner and outer annular members substantially free of relative axial movement therebetween; and means associated with said annular members for operatively positioning a portion of the frustroconical die surface of said female die member coaxially with respect to the frustroconical die surface of said forming die member, and for maintaining the frustroconical die surface of said female die member substantially free of axial movement relative to said inner annular member;

whereby rotation of said outer annular member operatively adjusts the annular space between the frustroconical die surfaces.

3. An extruder apparatus as recited in claim 2 wherein said means for operatively positioning a portion of the frustroconical die surface of said female die member coaxially with respect to the frustroconical die surface of said forming die member, and for maintaining the frustroconical die surface of said female die member substantially free of axial movement relative to said inner annular member comprises:

a sleeve member mounted coaxially with said auger member within said housing means for axial movement relative to said auger member, said sleeve member also having positioning means for positioning said female die member coaxially with and radially adjacent to portions of said forming die member;

means operatively associated with said inner annular member for attaching said inner annular member to said sleeve member substantially free of relative axial movement therebetween; and means associated with said inner annular member for retaining said female die member substantially free of axial movement relative to said sleeve member and to said inner annular member.

4. An extruder apparatus as recited in claim 1 wherein the frustroconical die surfaces of said forming die member and said female die member are generally of increasing diameter with increasing axial displacement from an inner position to an outer position.

5. An extruder apparatus as recited in claim 1 wherein the grooves formed in the die surfaces of said die members each comprise:

a leading surface of generally flat and shallowly angled configuration, and a trailing surface of generally flat and steeply angled configuration.

6. An extruder apparatus as recited in claim 1 wherein the number of grooves formed in the die surface of said female die member is greater than the number of grooves formed in the die surface of said forming die member.

7. A food product manufacturing apparatus for extruding strands of gelatinous cereal grain material for solidification into lengths of strands of curled food product, said food product manufacturing apparatus comprising die means for passing the gelatinous cereal grain material therethrough to form the lengths of strands of gelatinous material, and means operatively associated with said die means for changing cereal grain meal into gelatinous material and for extruding the gelatinous material through said die means, the lengths of strands of gelatinous material expanding into curled food product after extrusion; said die means comprising:

a first die member located in said die means in a longitudinally stationary postion, said first die member having a first curved-shaped die surface and a plurality of grooves formed in its first die surface;

a second die member having a second curved-shaped die surface generally complimentary in shape to the first curved-shaped die surface and also having a plurality of grooves formed in its second die surface, said second die member being operatively associated with said first die member and operatively positioned for longitudinal movement relative to the first die member, and said second die member also being operatively positioned with the second die surface in essentially face-to-face and separated relation complimentary with the first curved-shaped die surface of said first die member to define an extrusion orifice between the die surfaces of said first and second die members; and adjustment means operatively associated with said first and second die members for longitudinally moving the second die member relative to the first die member to adjust the amount of separation width of the extrusion orifice and to regulate the extrusion of the strands of gelatinous material from the extrusion orifice.

8. A food product manufacturing apparatus as recited in claim 7 wherein the grooves formed in the die surfaces and the curved shape of the die surfaces cooperate to promote a curling effect in the gelatinous material extruded through the extrusion orifice.

9. A food product manufacturing apparatus as recited in claim 8 wherein the number of grooves formed in the second curve-shaped die surface is greater than the number of grooves formed in the first curve-shaped die surface.

* * * * *